Oct. 10, 1933.  W. D. WILCOX  1,929,665
APPARATUS FOR DISSOCIATING HYDROCARBON GASES
Filed Aug. 13, 1930
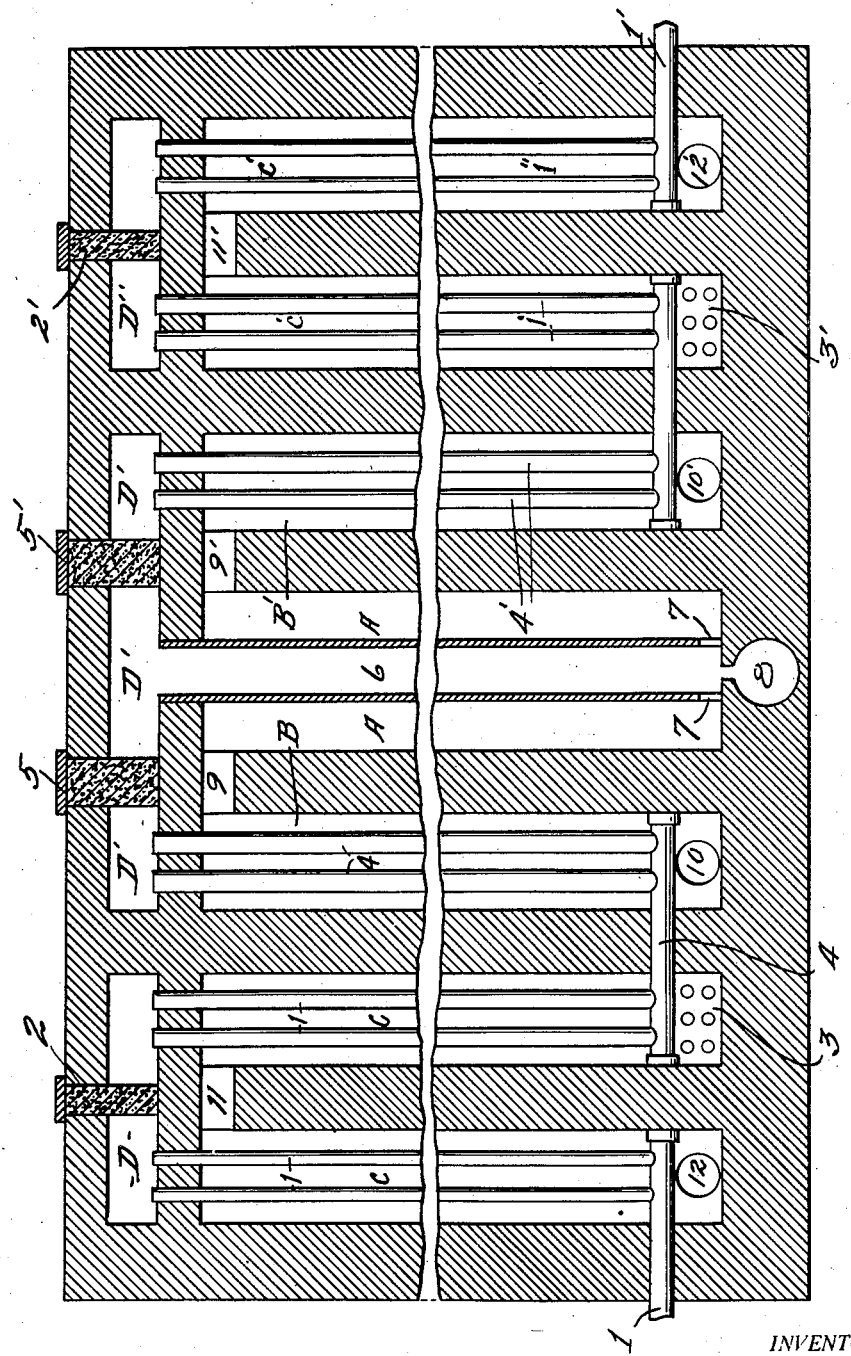
INVENTOR.
William D. Wilcox.

Patented Oct. 10, 1933

1,929,665

UNITED STATES PATENT OFFICE 1,929,665

APPARATUS FOR DISSOCIATING HYDRO-CARBON GASES

William D. Wilcox, Kansas City, Mo.

Application August 13, 1930. Serial No. 474,950

5 Claims. (Cl. 23—288)

It is the purpose of the apparatus shown by the enclosed drawing to provide an effective means by which hydrocarbon gases may be completely converted by heat and oxidation to mixtures of hydrogen and oxides of carbon, to mixtures of hydrogen, nitrogen and oxides of carbon, or more particularly into a mixture of hydrogen and carbon monoxide, suitable for use in the synthesis of methanol and/or higher alcohols, or, the oxides of carbon being eliminated a mixture of hydrogen and nitrogen in the proportions required for use in the synthesis of ammonia.

The drawing shows a vertical cross section of a dissociation chamber having walls of refractory material, further divided by interior walls into chambers C, C', B, B' and A. C and C' may be designated as primary heating chambers, B and B' may be designated as secondary heating chambers, A may be called a combustion chamber. As drawn there are chambers C and C', B and B' having a similar use, on each side of A, the advantage gained being that A, a chamber in which a high temperature is created is protected on each side from loss of heat by chambers in which lower temperatures are maintained, but my apparatus may be built with low temperature chamber on one side only of A. 1, 1', 4 and 4' are conduits preferably of heat resistant alloy steel. There is a continuous passage from the inlet of 1 through catalyst chamber D, 4 and catalyst chamber D' to and into conduit 6 which has refractory heat resistant walls. There is a continuous passage from the inlet of 1' through catalyst chamber D'' 4' and catalyst chamber D' to conduit 6. In operation hydrocarbon gases with an admixture of steam, not greatly in excess of the volume sufficient to oxidize the carbon of the hydrocarbons to monoxide, is admitted at the inlets of 1 and 1' and passed at a controlled rate through the system of conduits into 6. Simultaneously a combustible mixture of fuel gas and air introduced through 3 and 3', is burned. The combustion gases pass from 3 up C through passage 11 down and out through 12, from 3' up C' through 11' down and out through 12'. This combustion supplies part of the heat by which the desired reactions are brought about. The reactions may be accelerated by passage of the heated gases through a suitable catalyst placed at 2, 2', 5 and 5'. Temperatures and time of heating will be so controlled that the major part, from 75% to 85% of the hydrocarbons will be decomposed by the time they have passed to the base of 6, according to the reactions $CH_4$ plus $H_2O$ plus heat equals $CO$ plus $3H_2$. $C_2H_6$ plus $2H_2O$ plus heat equals $2CO$ plus $5H_2$. It is not practicable, even where an active catalyst is used, to secure a complete dissociation of the hydrocarbon gases at a temperature to which alloy steel can be subjected without material impairment unless the rate of flow through the pipes is greatly reduced and the time of subjection to heat so extended as to make the procedure industrially unattractive. Let us assume for the simplicity of illustration that the gas to be dissociated is a pure methane and that an 80% dissociation has been effected by the time the gas reached the base of conduit 6, 100 cu. ft. $CH_4$ plus 100 cu. ft. $H_2O$ plus heat equals 160 cu. ft. $H_2$ plus 20 cu. ft. $CH_4$ plus 20 cu. ft. $H_2O$ plus 80 $CO$. If the final product is to be used for the synthesis of methanol it is desirable that the carbon monoxide-hydrogen ratio be as one to two and that the gaseous mixture be free from any percentage of undecomposed methane. We will now introduce through 8 and into intimate mixture with the gas entering 6 through 7 and 7' 40 cu. ft. of oxygen. 160 cu. ft. $H_2$ plus 20 cu. ft. $CH_4$ plus 80 cu. ft. $CO$ plus steam plus 40 cu. ft. $O_2$ equals 200 cu. ft. $H_2$ plus 100 $CO$ plus steam. If it be desired in the synthesis of methanol to have a somewhat larger proportion of hydrogen than that at which it unites with carbon monoxide to form methanol a somewhat smaller volume of oxygen may be introduced. Assuming a temperature of around 1800° F. in the gas, the heat generated by the union of the admitted oxygen with the undecomposed methane or with hydrogen will bring the final temperature to from 2600° to a possible 3000° F.—temperatures which insure a complete dissociation of the methane residue. I rely largely in effecting this complete dissociation, upon the preference which oxygen displays for carbon rather than hydrogen at temperatures above 1800° F., which is the basis of the water gas reaction and upon its preference for hydrogen when present in a volume inadequate for complete combustion rather than for carbon monoxide. We may in the same apparatus obtain a mixture suitable for the synthesis of ammonia. Let us assume an 85% dissociation of a pure methane. 100 cu. ft. $CH_4$ plus 100 cu. ft. $H_2O$ plus heat equals 170 cu. ft. $H_2$ plus 85 cu. ft. $CO$ plus 15 cu. ft. $H_2O$. We now introduce through 8 100 cu. ft. of air which will preferably be heated prior to admission to a temperature around 1800° F., and most desirably to not less than 1300° F. 170 cu. ft. $H_2$ plus 85 cu. ft. CO plus 15 cu. ft. CH$_4$ plus 15 cu. ft. H$_2$O plus 21 cu. ft. O$_2$ plus 79 cu. ft. N$_2$ equals 173 cu. ft. H$_2$ plus 100 cu. ft. CO plus 28.5 cu. ft. H$_2$O plus 79 cu. ft. N$_2$. When by a later well known procedure the 100 cu. ft. CO are converted to CO$_2$ with production of hydrogen and the CO$_2$ absorbed out, allowance being made for the loss of hydrogen and incomplete conversion of CO to CO$_2$, the proportions of nitrogen and hydrogen will be found very nearly in the one to three ratio desired. Operative experience will assist in working to this result.

The highly heated gas formed in and passing up chamber A imparts considerable heat to the gas passing down the enclosed conduit. It passes through 9 and 9′ and down through B and B′ to outlets 10 and 10′. In this passage it travels in counter current relation to the gases passing upward in the enclosing pipes and imparts much heat through the walls.

I am aware of prior issued patents in which a dissociation of hydrocarbon gases or vapors has been sought either to carbon and hydrogen or, with steam or steam and air added, to mixtures of hydrogen with oxides of carbon or hydrogen oxides of carbon and nitrogen, by passing the gas through metal pipes, externally heated to temperatures theoretically adequate to effect a complete dissociation. The success of these procedures has been handicapped by the absence of pipe materials capable of withstanding the temperatures stated and further handicapped by the very slow rate at which equilibrium is approached when the proportion of undecomposed hydrocarbons is greatly reduced. It may fairly be said that following the procedures as described there was not a complete dissociation, even with a time of subjection to heat such as made the procedure industrially unattractive. So far as I can ascertain no one has developed plant such as shown by the accompanying drawing or has proposed operations such as I have described.

While I contemplate the use of catalysts, iron or nickel, to increase the rate of dissociation or to lower the temperature at which any particular rate is obtained, I do not regard such a use of catalysts as necessary. I propose to use only so much steam as insures an adequate supply to support oxidation of carbon to monoxide, consideration being had to equilibrium relations. Use of an excess of steam is more nearly desirable when oxidation to carbon dioxide is ultimately to be effected, but such excess absorbs heat and stands in the way of attaining the high temperature regarded as desirable to insure a complete dissociation of the hydrocarbons. Where the mixture desired is one suitable for the synthesis of ammonia, conversion of the monoxide to dioxide and elimination of the dioxide will be carried out in apparatus supplemental to that shown in my drawing. What I claim as new and desire to protect by the issuance to me of Letters Patent is—

1. In apparatus for the dissociation of hydrocarbon gases and vapors, the combination of a refractory walled chamber having refractory division walls, a primary heating chamber within this chamber, a system of pipes within this primary heating chamber, means for introducing a mixture of hydrocarbon gases and steam into and passing them through these pipes, means for introducing fuel gas and air into the farther extremity of the primary heating chamber and for passing the combustion gases in contact with the pipes counter current to the direction of travel of the gases within the pipes, an outlet for the discharge of the combustion gases from the primary heating chamber, a catalyst containing chamber placed intermediately in the travel of the gas-steam mixture through the primary heating chamber, means for introducing catalyst material and removing it from this chamber, a secondary heating chamber, a continuation of the pipes through this chamber, a catalyst containing chamber, means for introducing catalytic material and for removing it from this chamber, a refractory walled conduit conveying the gases from the catalyst containing chamber, means for discharging the treated gases from the base of the conduit into a combustion chamber and of adding thereto air, oxygen, or air enriched with oxygen, in controlled volumes, means of passing the gases from the combustion chamber into the secondary heating chamber and causing them to pass downward in contact with the pipes therein in counter current relation to the travel of the gases within the pipes, means for withdrawing the gas from the base of the secondary heating chamber.

2. In apparatus for the dissociation of hydrocarbon gases and vapors, the combination of a refractory walled chamber, division walls within the chamber, a primary heating chamber, a system of pipes within the chamber, means for admitting a mixture of hydrocarbon gases and steam into and for causing them to pass through the pipes, means for maintaining an active combustion within the primary heating chamber and for causing the combustion gases to contact with the outer surface of the pipes and to pass through the chamber counter current to the travel of the gases within the pipes, a catalyst containing chamber intermediately placed within the travel of the gas steam mixture through the primary heating chamber, means for introducing catalytic material into this chamber and for withdrawing it therefrom, a secondary heating chamber, a continuation of the system of pipes into this chamber, a second catalyst chamber, means for introducing catalytic material into this chamber and of withdrawing it therefrom, a refractory conduit, means for passing the gases from the second catalyst chamber downward through the conduit, means of introducing oxidizing gases into the base of the conduit, a combustion chamber, means for passing the gases from the conduit into the combustion chamber, means for passing the gases from the combustion chamber down through the secondary heating chamber in contact with the pipes therein counter current to the travel of the gas within the pipes and for discharging the gases from the base of the secondary heating chamber.

3. In apparatus for the dissociation of hydrocarbon gases and vapors, the combination of a primary heating chamber, a system of pipes within the chamber, means of introducing a mixture of hydrocarbon gases and steam and of causing them to pass through the pipes, means for maintaining an active combustion within the chamber whereby the gases within the pipes are heated, a secondary heating chamber, a continuation of the system of pipes within the chamber, means of passing the gas from the extremity of this pipe system into a refractory conduit, means for introducing oxidizing gases into the base of the conduit, means for discharging the gases from the base of the conduit into a combustion chamber, means for passing the gases through the combustion chamber and thence through the secondary heating chamber and of withdrawing them therefrom.

4. In apparatus for the dissociation of hydrocarbon gases and vapors, the combination of a refractory walled chamber, refractory dividing walls within the chamber, a centrally placed combustion chamber enclosing a refractory walled conduit, primary and secondary heating chambers on each side of the combustion chamber, a system of pipes within the heating chambers, means for introducing a mixture of hydrocarbon gases and steam into the system of pipes and for causing them to discharge into the refractory walled conduit, means for maintaining an active combustion within the primary heating chambers, means for introducing oxidizing gases into the base of the refractory walled conduit, means for passing the gases from the conduit into the combustion chamber and for passing them from the combustion chamber through the secondary heating chamber and of withdrawing them therefrom.

5. In apparatus for the dissociation of hydrocarbon gases and vapors, the combination of a refractory walled chamber, refractory division walls within the chamber, a centrally placed combustion chamber enclosing a refractory walled conduit, primary and secondary heating chambers within the chamber on each side of the combustion chamber, a system of pipes extending through the heating chambers, means of maintaining an active combustion within each of the primary heating chambers, means for introducing a mixture of hydrocarbon gases and steam into the pipe system and to cause it to travel through the pipes into the refractory conduit, catalyst containing chambers interposed within the pipe system, means for introducing catalytic material into these chambers and of withdrawing it therefrom, means for introducing oxidizing gases into the base of the refractory conduit, means of passing gases from the conduit into the combustion chamber, thence through the secondary heating chambers and of withdrawing them therefrom.

WILLIAM D. WILCOX.